(12) United States Patent
Chatow et al.

(10) Patent No.: US 9,449,119 B2
(45) Date of Patent: Sep. 20, 2016

(54) PRODUCT VISUALIZATION

(71) Applicant: HEWLETT-PACKARD DEVELOPMENT COMPANY, L.P., Houston, TX (US)

(72) Inventors: Ehud Chatow, Palo Alto, CA (US); John Ludd Recker, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 509 days.

(21) Appl. No.: 13/742,170

(22) Filed: Jan. 15, 2013

(65) Prior Publication Data

US 2014/0200858 A1 Jul. 17, 2014

(51) Int. Cl.
*G06F 17/50* (2006.01)

(52) U.S. Cl.
CPC .......... *G06F 17/50* (2013.01); *G06F 2217/06* (2013.01)

(58) Field of Classification Search
USPC ................. 703/1, 2; 345/419, 420; 717/116; 705/29; 707/793
See application file for complete search history.

(56) References Cited

U.S. PATENT DOCUMENTS

| | | | | |
|---|---|---|---|---|
| 8,745,086 B2* | 6/2014 | Cardno et al. | ................. | 707/778 |
| 8,762,941 B2* | 6/2014 | Loberg | ......................... | 717/116 |
| 8,818,769 B2* | 8/2014 | Trainer | .................... | G06F 17/50 703/1 |
| 8,866,816 B2* | 10/2014 | Cardno | ......................... | 345/440 |
| 8,892,404 B2* | 11/2014 | Potter | ..................... | G06F 17/50 703/1 |
| 2006/0114490 A1 | 6/2006 | Rolleston et al. | | |
| 2009/0063557 A1* | 3/2009 | MacPherson | ......... | G06T 11/206 |
| 2010/0214598 A1 | 8/2010 | Hoppenot et al. | | |
| 2010/0268513 A1* | 10/2010 | Loberg | ............... | 703/1 |
| 2011/0189440 A1* | 8/2011 | Appleby et al. | ............. | 428/156 |
| 2011/0261049 A1* | 10/2011 | Cardno et al. | ................ | 345/419 |
| 2012/0053986 A1* | 3/2012 | Cardno et al. | ............... | 705/7.29 |
| 2012/0105431 A1 | 5/2012 | Williams | | |
| 2012/0109590 A1* | 5/2012 | Trainer | ................... | G06F 17/50 703/1 |
| 2012/0109592 A1* | 5/2012 | Potter | .................... | G06F 17/50 703/1 |
| 2012/0110595 A1* | 5/2012 | Reitman | ................. | G06F 17/50 719/313 |
| 2012/0162202 A1 | 6/2012 | Rolleston et al. | | |

OTHER PUBLICATIONS

"3D Folding", CHILI PublisherCHILI EditorV3: 3D Folding.

* cited by examiner

*Primary Examiner* — Thai Phan
(74) *Attorney, Agent, or Firm* — AlbertDhand LLP

(57) ABSTRACT

A method comprises receiving a change request input from a user to change one or more parameters of a product in a product visualization; determining at least one available option based on the change request input and manufacturable capabilities; and presenting a modified product visualization to the user based on at least one determined available option.

20 Claims, 4 Drawing Sheets

PRODUCT VISUALIZATION

BACKGROUND

Taking products from design to manufacture can entail generation of designs, samples and prototypes for evaluation. In this regard, the design may be performed using a graphical user interface (GUI) or a GUI-based design program. The design may include specification of a shape, color, size or other parameters of the object. Based on a design, a sample and/or prototype may be generated prior to actual manufacturing of the product.

BRIEF DESCRIPTION OF THE DRAWINGS

For a more complete understanding of examples described herein, reference is now made to the following descriptions taken in connection with the accompanying drawings in which.

DETAILED DESCRIPTION OF THE DRAWINGS

Figure 1:
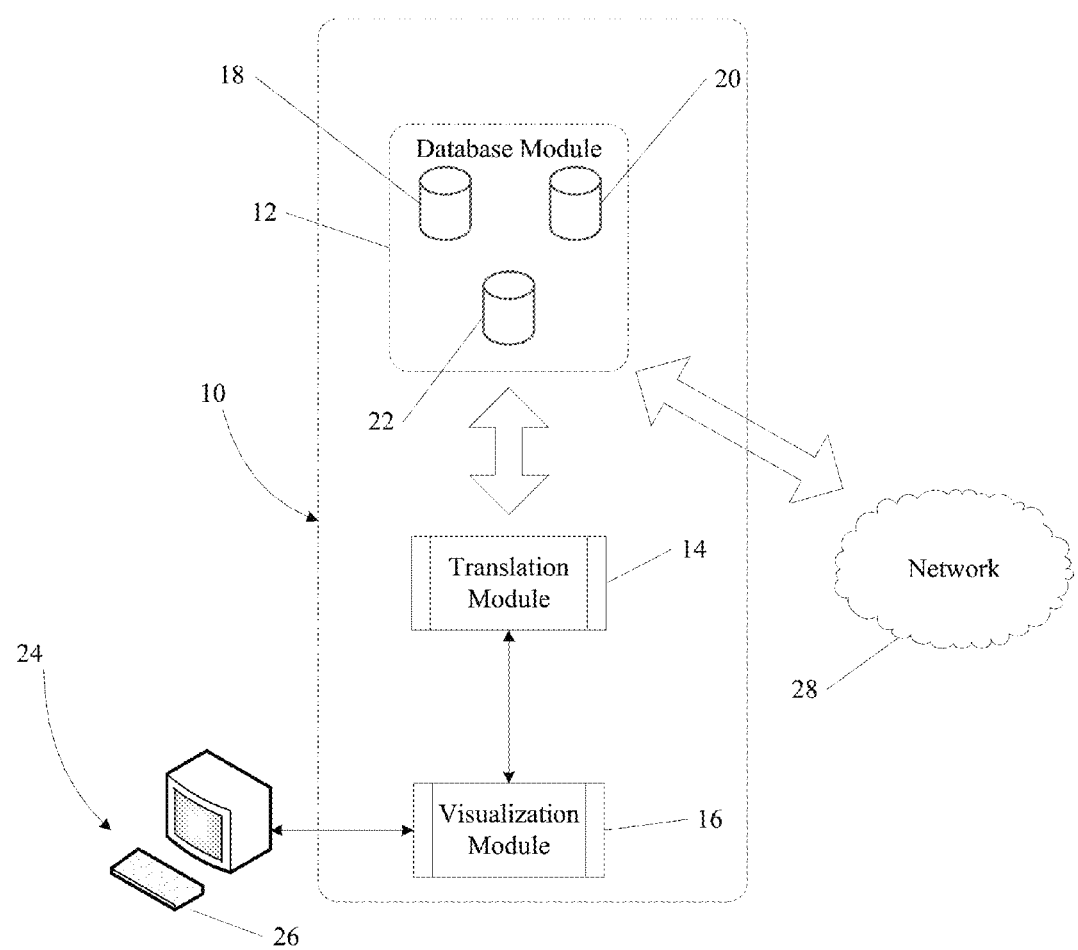
FIG. 1 is an overview of a system according to an example.

Examples of the present invention and their potential advantages are understood by referring to FIGS. 1-4 of the drawings.

Taking products from design to manufacturability is a time-consuming and costly process. Current widely-accepted practices often require multiple cycles of trial and error and generation of samples and prototypes for evaluation after each design change or iteration. Without a direct connection or path between a product design on the one hand, and manufacturing capabilities and limitations on the other, it is difficult and inefficient for a creator to judge the appearance and/or overall feel of a manufactured product without reviewing an actual physical sample. Creating a physical sample may be an expensive and time-consuming endeavor. Even after generating a physical sample of the product, if a creator is not satisfied with a product after evaluating a physical sample or prototype, he or she may wish to make a further change and evaluate the appearance or feel of another design choice associated with a particular design feature. Especially when design choices may involve color scheme, finishing options, printer rendering capabilities or production capabilities of printers and manufacturers, the generation of a physical sample or prototype may be necessary or desirable, so that the creator may evaluate the physical representation of design choices before finalizing a product design for production. Creators are reluctant to commit precious financial resources and time to the production of products until the appearance and/or feel of a product is satisfactory. Thus, multiple cycles of trial and error may be undertaken before arriving at and approving a final design, particularly when a creator cannot easily appreciate and evaluate how production capabilities may affect a product.

Product creators, manufacturers and printers thus stand to benefit greatly from any reduction in costs or elimination of steps in the design-to-manufacturing cycle. However, achieving these is often challenging because changes to product design and finish options often require a physical sample, to confirm the manifestation of design and finishing choices in the physical product, especially in light of available material properties, as well as manufacturing processes and capabilities. Further difficulties often arise as an idealized design is often conceptualized independent of any specific manufacturer or manufacturing process. However, manufacturing capabilities, processes, tools and raw materials vary widely by manufacturer.

Product visualization has thus become a very useful process and tool in various fields, such as the printing and product manufacturing arenas. Many product visualization techniques and related software products can allow assembling and reviewing visualizations of print jobs and can facilitate evaluating of the effects of finishing options and printer or manufacturer rendering capabilities, as they impact product designs. Such tools can allow creator to visually manage options and review their implementation, even in three dimensions, without generating a physical sample or prototype. The advent of advanced technologies and computing processor capabilities has facilitated a highly accurate level of advanced product visualization. However, even the most brilliant digital product visualization tools for realistically depicting products will not eliminate the need for physical samples (and their related costs), if the tools cannot account for the effects of relevant manufacturing capabilities on the product. Thus, without a common and shared visualization tool that is informed as to the realistic manufacturing capabilities, iterative product-development cycles can cost precious time and add skilled labor costs to the production costs of a product. As an example from the printing industry, visualization solutions without a linkage to the realistic capabilities of print service providers (PSPs) prevents the PSPs or their fulfillment partners from demonstrating realistic 3-dimensional visualizations of products or configurations that are within their scope to produce or have fabricated. Efficiencies and cost/labor savings could thus be achieved with a common and shared visualization tool that is linked to realistic manufacturing capabilities.

As used herein, the terms "author," "purchaser," and "user" generally refer to those who generate, specify or create a particular product design (e.g., author/create/specify text and images, create document or other product layouts, assemble books, publications, or other documents), and who may deliver a product design to a manufacturer for production or manufacture of the product. A "manufacturer" may be, inter alia, a print service provider ("PSP"). For purposes of this description, the terms "author" "purchaser" and "user" are interchangeable, and refer to those in the same role, because they would likely utilize and interact with methods and systems described herein, in similar ways. For example, each of an "author" and a "purchaser" may be a "user" who defines a product design by specifying how he or she desires the product to appear when it is produced or manufactured. However, a "user" may also be one who facilitates an "author's" or "purchaser's" visualization of a product design, such as a clerk or staffer at a publisher or print shop. Moreover, "manufacturer" and "producer" are also interchangeable terms within this document, as each may be a person or entity that produces or fabricates the final product after the product design has been completed. Thus, a "manufacturer" or "producer" may be an independent entity or a contractor, or may operate as the "back end" or production department of a print shop, or operate in any other capacity or role as a producer, broker, supplier or fabricator of designed products. Examples may include, but are not limited to, print fulfillment centers and copy shops, as well as other printers of packaging materials, brochures, books, pamphlets, photobooks, etc.

As described in greater detail herein, systems and methods according to various examples may be directed to interactive common and shared hi-fidelity visualization tools that facilitate communications between users and product manufacturers. Such visualization tools may include or present predetermined or pre-populated families of products that can be selected or modified by purchasers and users as reflecting their desire for a particular manufactured product. Each product family may, in turn, include a set of configurations which may be chosen or modified by the purchaser to best match the purchaser's intent. For example, a purchaser may select and configure a printed product or quantity of such products for purchase, such as a book, bound presentation, or other manufactured item. Alternately, a user may access, import, or generate a product configuration or characteristics, properties or constraints corresponding to a new (i.e., not-predetermined or pre-populated) design or part of a design. In an example, such accessed, selected, imported or generated product designs may be configured to be presented to a purchaser as a visualization, such as 3-D model of the product, depicted or illustrated on a monitor. A user interface, such as a Graphical User Interface (GUI), for example, may allow a purchaser to define, design or build a desired product and specify its particular components via the user interface. In this manner, a purchaser may also view, evaluate, manipulate and configure the image of the subject product displayed, obtain detailed information about product components and properties, and interchange product components with others having different properties. Of course, any type of user interface or input method may be useful for this purpose. The user interface or input method may be interactive, and may facilitate a user's evaluation of and selection from a range of options for each design choice.

In an example, 3-D visualization capabilities are provided, which may be configured to facilitate a purchaser's interaction with the visualization platform, for defining the design of a desired product to match the purchaser's perceptual intent, e.g., how the purchaser desires the product to look and feel. A purchaser may thus virtually interact with the visualization of the product, e.g., a book, as if it were a real book. For example, the user can virtually pick the product up, rotate it, turn pages, etc., to evaluate the current configuration and decide whether changes should be made to reflect the user's intent. As mentioned above, product families may include sets of configurations corresponding to properties that correspond to a range of material components available for incorporation into a product, as well as production capabilities regarding the particular product. A purchaser may thus define his or her entire perceptual intent regarding a product or a particular product configuration by using a mouse or other type of input device to interact with the visualization of a product and specify or make selections as to product components, materials, fabrication parameters and capabilities, etc., that correspond to a user's vision of a product design. The visualization may be configured to depict a purchaser's or selections and configurations relating to available design features as they change in real-time in response to purchaser inputs and configurations. Thus, the 3-D visualization that a user sees corresponds to what can be produced or fabricated.

As mentioned above, in order to reflect a user's perceptual intent in a way that is actually producible, a user's configuration options with respect to the visualization model of a particular product or product family may correlate to real world criteria such as the mechanical and optical properties of material components available for incorporation into the product, as well as manufacturing constraints. That is, the 3-D visualization model may provide a graphic representation of a product on a screen and allow a user, through a user interface, to make selections relating to the user's design choices which, in turn, relate to design features such as particular material components and fabrication specifications, for example. A fabrication envelope may define a range of available selections and specifications that are realistic, available and manufacturable in light of product properties and manufacturer constraints. For example, configuration options regarding paper stock, other media selections, finishing options, or the color gamut and ink options of a PSP may allow for a broad range of selections relating to design choices, to reflect a user's perceptual intent. However, a user would be prevented from selecting any configuration options to incorporate aspects of his or her perceptual intent into the 3-D visualization that are not supported within the range, or fabrication envelope of realistic configuration possibilities. Moreover, in various examples, rather than presenting configuration options to a user as technical specifications to decipher and choose among, a user may be provided the freedom to configure the 3-D visualization according to the user's intent, within a fabrication envelope of configuration choices limited by or associated with actual material properties and production limitations. In addition to the obvious benefits of freedom for a user to define a design in a perceptual context, such examples allow users with little or no understanding of component properties and production processes to generate production-ready designs in an environment within which they are comfortable and adept. Moreover, realistic 3-D visualization of product designs that corresponds to actual, realistic material properties and production capabilities, provides an excellent and efficient way to review and approve designs without time-consuming generation of costly prototypes and samples.

In examples, component properties reflected in the 3-D visualization may include mechanical and optical properties of product components impact the design. Interchangeability of components may also be provided. For example, the 3-D visualization platform, described in greater detail below, may allow a user to utilize a mouse or other input device to manipulate a 3-D model of a prospective product to change the bend angle (or paper stiffness) of a photobook substrate. As a result, a new substrate may automatically be defined and depicted in the model, per the angle selected or specified in the 3-D visualization. This provides a purchaser, even one with little or no understanding of relationships between design considerations and material properties or manufacturing processes, with a straightforward way of modeling a desired product, while taking into account capabilities and limitations with respect to fabrication of the product. A scope of manufacturable quantum (e.g., discrete) possibilities may thus be translated or converted and made available to a user as configuration options for use in defining a design in a high-quality 3-D visualization environment with a user interface.

In an example, modifications to aspects of the 3-D visualization may clip, or map to a step along a spectrum of quantum possibilities that represents the closest available manufacturable configuration. In addition, by adjusting individual design choices to realistic and available selections, other related factors may be automatically defined so that an entire design of a product remains within the scope of available design constraints. An accurate 3-D visualization that is presented to a user allows the user to configure and evaluate a realistic depiction of a design before moving to fabrication or production of the product. For example a user may input a specific desired page bend angle for a book product as a design choice. Then, the user's design choices may be automatically mapped to specific available design features such as paper weight options or ink selections, for example, that fulfill or are compatible with the user's design choice. In an example, the mapping and selection of specific design features that fulfill a user's design choices may be hidden from the user, so that only the visualization of the user's design choices are presented to the user while the user is modifying the design. Alternately, the mapping and selection of design features in response to a user's design choices may be completely transparent to the user.

As mentioned above, examples may be configured as a platform with a common communication language, interfaces and protocols for allowing numerous users and manufacturers (e.g., PSPs) to interface and communicate with respect to product ordering, product visualization and configuration and, finally, product manufacture. Turning now to FIG. 1, there is illustrated a representative system according to an example. The system 10 may include various components, such as modules 12, 14, 16. A database module 12 may include one or more backend databases 18, 20, 22, which may store data such as mechanical, optical and other properties of print components such as, for example, paper, bindings, etc. The backend databases 18, 20, 22 may also include data associated with various print equipment, such as printers or finishers. One or more of the databases 18, 20, 22 may also be populated with data corresponding to the capabilities of one or more manufacturers, such as PSPs, as well as data corresponding to material availability and production capabilities which detail how products are fabricated from component materials. The databases may also be updatable to reflect changes in the print components and capabilities of PSPs.

A translation module 14 may be capable of querying databases 18, 20, 22, and also converting component and production specifications into user perceptual axes, that reflect and capture operations performed and selections made by a purchaser directly on the 3-D model via a user interface during the design process. As discussed above, these user operations and selections, as may be reflective of a user's perceptual intent, may constitute more than a mere direct selection of available component materials, such as based on their technical specifications, for example. Rather, in various examples, translation module 14 may perform mapping between intuitive user interface controls and available materials and manufacturable options that are available from a particular PSP or multiple PSPs, for example. For example, permissible design choices may be made available to a user based on selections from the material and production capability data in databases 18, 20, 22. The translation module may facilitate this selection of production capabilities and make respective design options available to a user. Furthermore, a platform in accordance with various examples may be configured to not allow a user to make design selections and choices that are not permissible design choices from the material, equipment and production process data stored in databases 18, 20, 22. As discussed above, each design choice (e.g., thickness, texture, bleed-through, etc.) reflects a user's perceptual intent and may be associated with a particular design feature (e.g., specific available paper characteristics, ink selection, color gamut, etc.).

A visualization module 16 may be provided to interface with a user device 24 with interface controls 26 provided for a user to generate a realistic 3-D visualization of the user's perceptual intent, or design concept, with respect to a subject product. The user device 24 may be a desktop computer, a laptop, a tablet or any of a variety of other devices. In one example, the user device 24 communicates with the system 10 through a network, which may be a private network or a public network (e.g., the Internet). Modules 14 and 16 may, in turn, be configured to interact or communicate with each other to facilitate the generation of a user's design concept and provide visualization at the user device 24, in light of component and manufacturing process data stored in databases 18, 20, 22.

In various examples, the visualization module 16 affords a user the ability to view a high-quality rendering of a product design in three dimensions, through the user device 24, and thus interact with and evaluate the appearance of the product, including such details as page bleed-through and page curvature when a book is open, for example. The 3-D visualization may show both mechanical and optical properties of the visualized product and component properties including fine details such as, among others, gloss level, texture and type of paper, ink on the paper, and finishing options. In conjunction with viewing a high-quality 3-D rendering of a product, a user may employ interface controls 26 to virtually flip-through a model of a book, for example, and change paper opacity to decrease bleed-through, or increase or decrease the curve of a page when the book is opened. The user's selection or specification of design choices would be mapped to corresponding design features such as material and component properties, and a rendering incorporating the respective properties would be presented to a user as a 3-D visualization. This allows a user to incorporate and instantly evaluate the effect of such perceptual intent design considerations, as opposed to merely selecting from lists of available materials and manufacturable options. The translation module 14 provides mapping between the intuitive user interface inputs and the material and production process data in the backend databases 18, 20, 22, allowing the user to specify design choices that are realistic selected from permissible and available parameters, and preventing the user from making design choices that are not realistically producible. In an example, actual technical specifications regarding component materials may thus be invisible to a user, so that the user may focus on his or her intent on perceptual intent-based product design, while keeping within realistic design constraints imposed by actual material properties and manufacturing limitations. Thus, the design options presented to the user in the 3-D interface may exist within a fabrication envelope that is defined by the actual relevant material and process constraints corresponding to the material properties and fabrication parameters.

Thus, the translation module 14 may be configured to translate or convert mechanical and optical print component specifications that are stored as data in databases 18, 20, 22 into user perceptual axes that are bounded by material and process constraints. In one example, the translation module 14 performs a translation or conversion that may be a mapping between different dimensional spaces. That is, one space may be defined by user intuitive axes (e.g., bleed-through, paper bend, perceptual gloss metrics, as perceived and manipulated by a user via a user interface and a 3-D visualization), while another space may be defined by material specification axes (e.g., paper weight, gloss index, brightness, etc.). The user may work on the 3-D visualization of a product within the perceptual or intuitive space to implement and evaluate the user's design choices. However, these choices are limited to coordinates that map or are translatable to a product design in light of data reflecting available materials, fabrication limitations and manufacturable combinations, for which the translation module 14 may query databases 18, 20, 22.

As an example in connection with an example, a user may desire to design a photobook product with a specific cover type, paper type, and a specific color gamut. After uploading images of the photobook, a 3-D realistic view of the product may be rendered and presented to the user, so that the user can interact with the rendering to evaluate the appearance of the product, e.g., by virtually rotating the product to view it from any angle, or flipping through the pages. Based on appearance and virtual feel of the flipped pages in the rendering, the user can decide to change parameters and properties, such as page thickness, length and width, for example. In an example, the user may be able to drag the 3-D view of a folded page toward the spine of the book, so that a thicker paper stock may be selected and included in the design. Furthermore, the user's design selections may be made available or implemented in the form of quantum steps, whereby the user's selections and design choices are clipped to the nearest available respective manufacturable options, as they may exist based on available materials, material properties, and manufacturing constraints. In some examples, a change in one paper parameter by a user may lead to a change in one or more other parameters based on the available manufacturing database. In various examples, such capabilities and constraints may be stored in a backend database or table of properties.

In various examples, various parts, components and characteristics available to a user in a 3-D model visualization such as color gamut and ink options, for example, may be linked to physical and process properties of a manufacturer, such as a print service provider (PSP). In addition, changes and updates to the functionality of one or more PSPs may appear in conjunction with the visualization. In various examples, the design choices made available to a user may be based on the aggregate capabilities of each of the contributing PSPs. For example, when a PSP adds a new type of art paper or die cutting device, the respective characteristics, descriptions and options may be included in the purchaser's visualization, so that a purchaser may be fully aware of the complete range of available options. In an example, this and other communications between various involved parties and equipment may be facilitated via cloud-based architecture. As seen in FIG. 1, data regarding product component properties, manufacturer capabilities and material inventory status, as well as manufacturing process limitations and parameters, may be contained in databases 18, 20, 22, and may be updated in databases 18, 20, 22, via web-based or other network connections 28.

Figure 2:
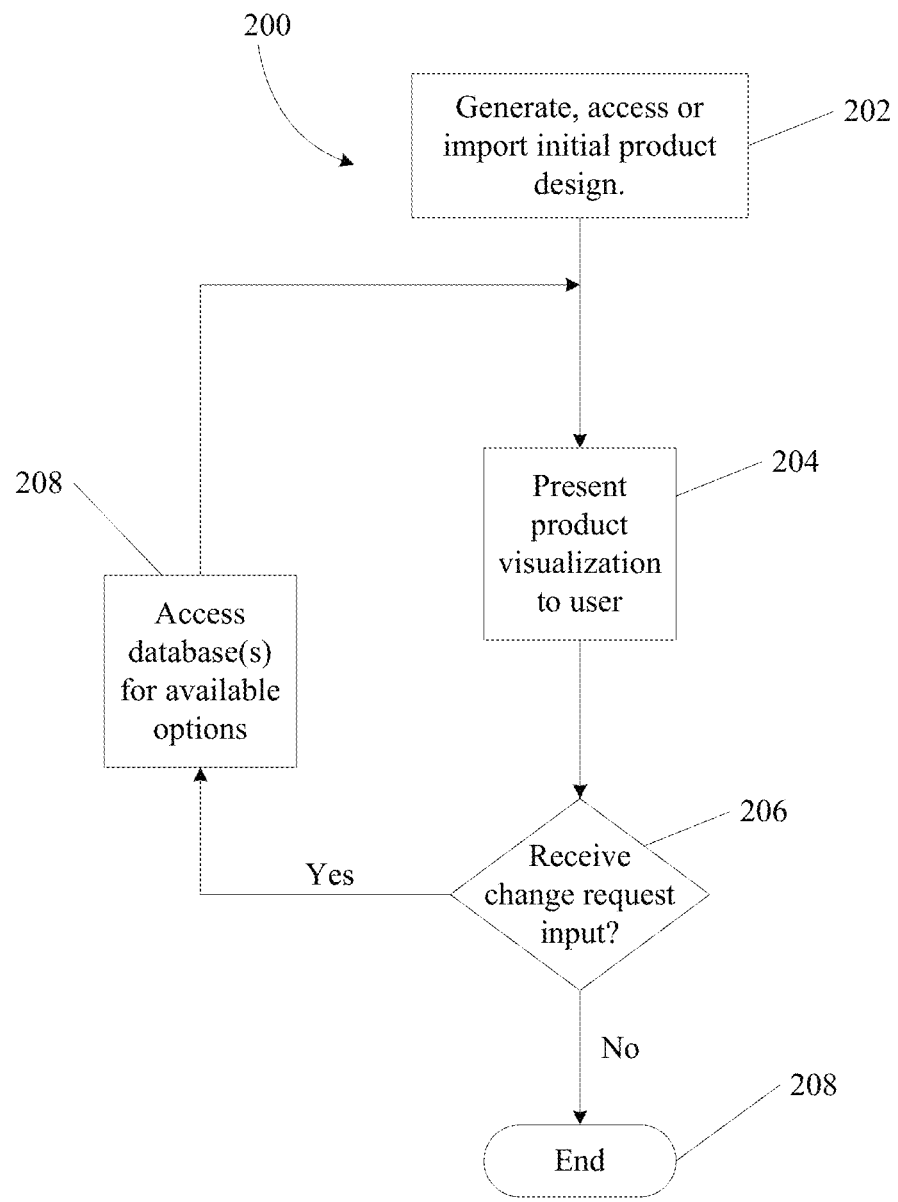
FIG. 2 is a flow chart illustrating a process according to an example.

Having described an overall system architecture and features and functionality that may be incorporated into systems and methods described herein, attention is now turned to an exemplary process. FIG. 2 illustrates a flow chart of a process in accordance with an example, depicting various steps that such an example process may include.

As illustrated in FIG. 2, the process 200 may begin with an initial product design that may be generated, accessed or imported, for example, on or into an interface that renders a 3-D visualization of the initial product design (block 202). The visualization may be presented to the user through, for example, the visualization model 16 (block 204). A user may refine the design using, for example, a user interface to achieve the user's perceptual intent with respect to the product. The user may achieve his or her perceptual intent in a design context, wherein the user's design choices are expressed as configuration options of design features, which configuration options correlate to properties of product component materials and production constraints. As discussed above, product component material properties and production constraints received as data inputs are mapped to configuration options presented to and selected by a user, such that the product design proceeds and is finalized in accordance with available and realistic manufacturing parameters. For example, after being presented with the visualization of the product (block 204), a user may evaluate the current stage of the design and its relationship to the user's perceptual intent. Using a user interface and the user device 24, the user may change one or more parameters of the product. The visualization module 16, for example, may receive the change as a request input from the user. If no such input is received, the design process terminates (block 208). If a change request input is received (block 206), the visualization module 16 and/or the translation module 14 may access one or more databases (e.g., backend databases 18, 20, 22) to identify available options (block 208). In this regard, the available options may include the closest match to the user's request (e.g., through a quantum change). The process then returns to block 204, where the modified product visualization may be presented to the user.

The user may thus evaluate the appearance of the product as incorporating any new configurations or newly-selected features. In an example, the 3-D visualization may provide a sophisticated rendering of the product so that a purchaser may also judge the feel or physical properties of changes, such as how the weight of a particular style of paper or the type of binding will affect the page opening angle of an assembled book product, for example. The 3-D visualization may thus provide a purchaser with a virtual sample of how various configurations, specifications and properties would appear in and affect a product.

The user's change requests may be manifest in the selection of, for example, other component materials, or changes to the product configuration or appearance-related items such as color, font, etc. As discussed above, design changes are informed and constrained by data regarding materials and manufacturability, as may be input by the user, and mapped to a user's design selections. Cycles of design evaluation and modification of perceptual intent may continue until the user is satisfied.

Figure 3:
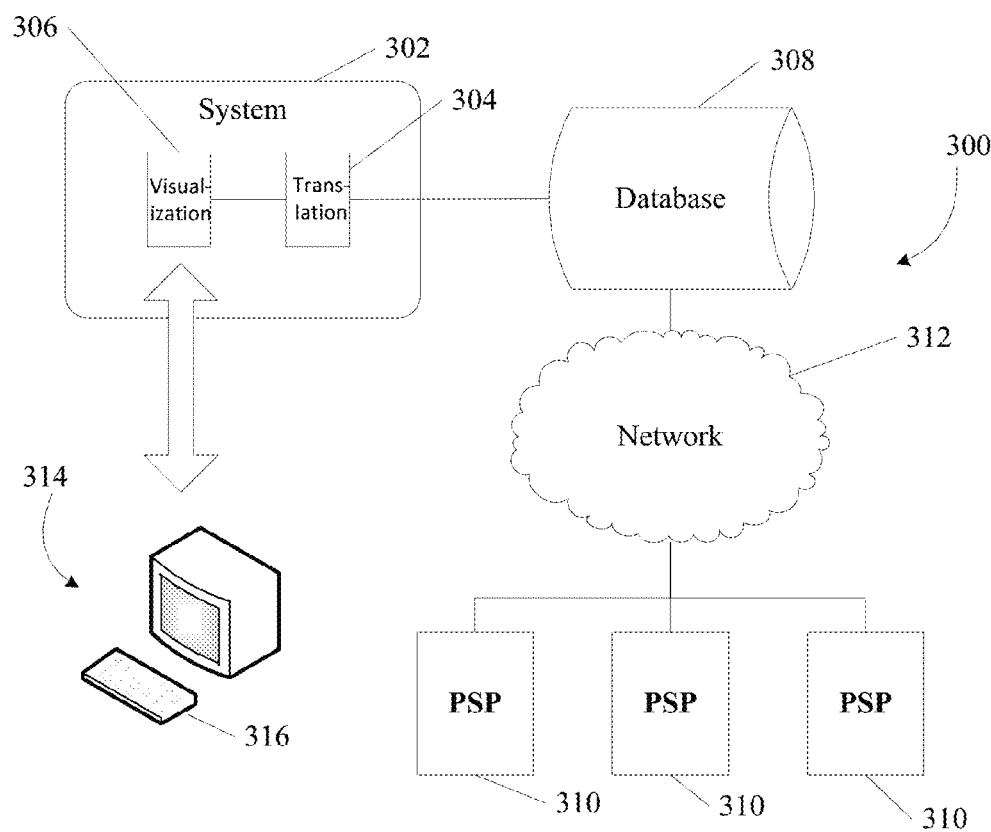
FIG. 3 is a schematic illustration of a system according to an example.

FIG. 3 illustrates an example arrangement 300 through which the various example methods and features described herein may be implemented. The arrangement 300 may include a system 302 which may further include a translation module 304 and a visualization module 306. A database 308, connected to the translation module 304 of the system 302, may include information regarding various product component material properties and information regarding production capabilities, for example. Such information may be pre-populated in the database 308, or may be input and updated by various product manufacturers, such as print service providers (PSPs) 310. Data input and updated in the database 308 may vary from one PSP to another, thus allowing a user to define and configure a product design specifically considering the capabilities of a particular PSP in accordance with the newly selected PSP's capabilities. Data may be input and updated by PSPs through various wired and wireless networks 312, such as the Internet. A user may generate, access import and/or modify a product design at terminal 314, using keyboard 316, or other input devices, such as a mouse, stylus, trackwheel or any other user interface tools available for a user to operate on or modify a digital 3-D visualization of a product design. The translation module 304 may map, or correlate, user design configurations to product material and manufacturing options and configurations which may be based on the data stored in database 308. As discussed above, the translation module 304 tracks user changes to a product design and provides the user with a translation of the manufacturing and product constraints to facilitate a user's incorporation of his or her perceptual intent into product design, while maintaining compliance with material properties and production process constraints. In turn, the visualization module 306 may facilitate depiction of the product design in light of user design choices that are correlated to available configuration options that may be based on the relevant material properties and production process constraints.

FIG. 3 illustrates the database 308 connected to the PSPs 310 through a network. In this regard, it will be understood by those skilled in the art that various communications in the arrangement 300 may be either through a direct connection or a network. For example, the user device 314 may communicate with the system 302 through a network, such as the Internet. Similarly, in one example, communication between the system 302 and the database 308 may be through a network. In another example, the database 308 may be an integral part of the system 302.

As discussed above, making changes to the 3-D model via a user interface provides instant feedback as to how selecting a new option or changing a design parameter will affect the manufacturability of the product, or even whether the product is manufacturable at all in the desired configuration. For example, when a purchaser selects a different type of paper while working on the 3-D visualization, the visualization will instantly depict the product with the newly-selected paper included.

In addition, examples may provide for quality checks throughout the product design and visualization process, to ensure that the design meets both a user's perceptual intent, and the manufacturer's processes and capabilities. For example, when a user selects a particular paper weight, the user may be constrained from specifying particular ink or color choices which may result in bleed-through or other undesirable effects. Examples may also incorporate functionality to allow transmittal of a final design directly to a manufacturer for processing and assembly of an actual product, and for purchasers, users, or product brokers to enter into contracts with manufacturers for fulfillment of product orders, so that the entire process, from visualization to finished product may be facilitated by the platform, including quality control of the process from design to fulfillment. In an example, the entire process may occur at a single party's facility. Alternately, facilitation of the various steps may be distributed among the resources and facilities of individual users, PSPs, print shops, brokers, manufacturers, etc.

It is to be understood that the various examples of the present invention may be implemented individually, or collectively, in devices comprised of various hardware and/or software modules and components. Such a device, for example, may comprise a processor, a memory unit, and an interface that are communicatively connected to each other, and may range from desktop, server and/or laptop computers, to consumer electronic devices such as mobile devices and the like. Such devices may include input and peripheral devices, and other components that enable the device to read and receive data and instructions from various media, input devices, a network, or other inputting means in accordance with the various examples of the invention. It should be understood, however, that the scope of the present invention is not intended to be limited to one particular type of device or configuration of devices.

Figure 4:
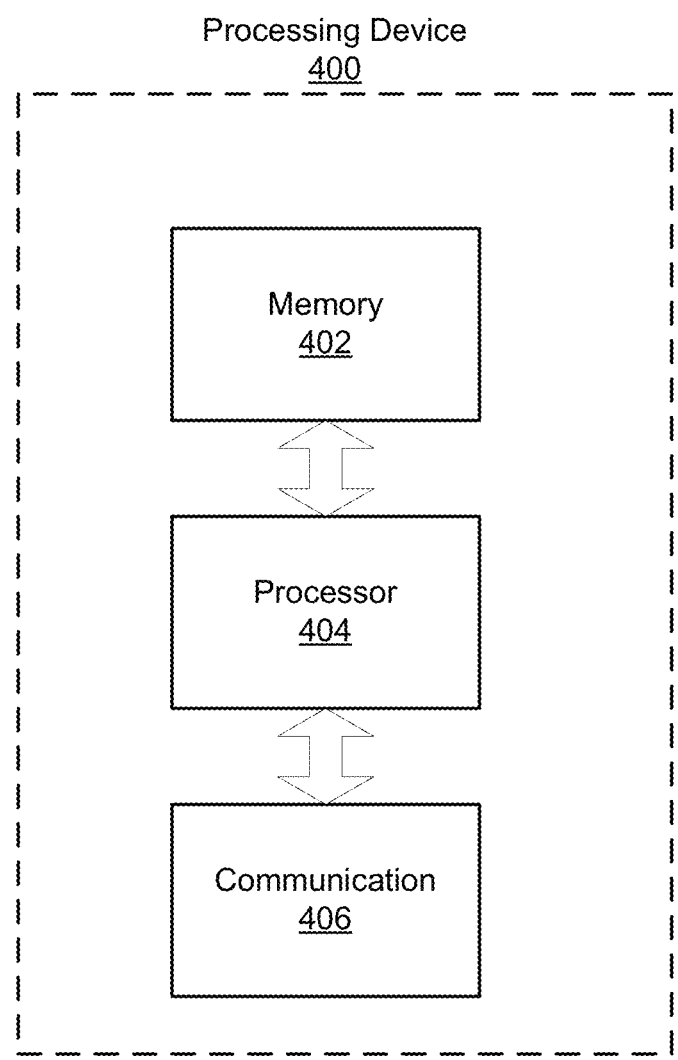
FIG. 4 is a schematic illustration of an example device in accordance with an example.

As an example, FIG. 4 illustrates a block diagram of an example device 400 within which various examples may be implemented. In one example, the device 400 may include the system 10 of FIG. 1. The device 400 comprises at least one processor 404 and/or controller, at least one memory unit 402 that is in communication with the processor, and at least one communication unit 406 that enables the exchange of data and information, directly or indirectly, with a communication medium, such as the Internet, or other networks, entities and devices. The processor 404 can execute program code that is, for example, stored in the memory 402. The memory 402 may also include the various databases described above, such as the backend databases 18, 20, 22 of FIG. 1. The communication unit 406 may provide wired and/or wireless communication capabilities in accordance with one or more communication protocols and interfaces, and therefore it may comprise the proper transmitter/receiver antennas, circuitry and ports, as well as the encoding/decoding capabilities that may be necessary for proper transmission and/or reception of data and other information.

Similarly, the various components or sub-components within each module of the present invention may be implemented in software, hardware, and/or firmware. The connectivity between the modules and/or components within the modules may be provided using any one of the connectivity methods and media that is known in the art, including, but not limited to, communications over the Internet, wired, or wireless networks using the appropriate protocols.

Various examples described herein are described in the general context of method steps or processes, which may be implemented in one example by a computer program product or module, embodied in a computer-readable memory, including computer-executable instructions, such as program code, and executed by apparatus such as computers or computing systems in networked environments. A computer-readable memory may include removable and non-removable storage devices including, but not limited to, Read Only Memory (ROM), Random Access Memory (RAM), compact discs (CDs), digital versatile discs (DVD), etc. As such, the various disclosed examples can be implemented by computer code embodied on non-transitory computer readable media. In other examples processes may be employed to perform operations on data, wherein the instructions for process operations and the data, or elements thereof, may reside on or be transferred through one or more computing devices or systems.

Generally, program products or modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various examples may comprise a computer-readable medium including computer executable instructions that, when executed by a processor, cause an apparatus to perform the methods and processes described herein. Apparatus or systems utilized in connection with the invention may be of a general-purpose character, or may be specially constructed, designed or programmed for the required purposes. In examples of the invention, such apparatuses and systems may be configured or activated by computer programs, instructions and/or data stored in or transferred into the apparatus or system.

Furthermore, examples of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example, the application logic, software or an instruction set is maintained on any one of various conventional computer-readable media. In the context of this document, a computer-readable medium may be any media or means that can contain, store, communicate, propagate or transport the instructions for use by or in connection with an instruction execution system, apparatus, or device, such as a computer, with one example of such a device described and depicted in FIG. 4. A computer-readable medium may comprise a computer-readable storage medium that may be any media or means that can contain or store the instructions for use by or in connection with an instruction execution system, apparatus, or device, such as a computer. In one example, the computer-readable storage medium is a non-transitory storage medium.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described examples and/or the dependent claims with the features of the independent claims, and not solely the combinations explicitly set out in the claims.

The foregoing description of examples has been presented for purposes of illustration and description. The foregoing description is not intended to be exhaustive or to limit examples of the present invention to the precise form disclosed, and modifications and variations are possible in light of the above teachings or may be acquired from the practice of various examples. The examples discussed herein were chosen and described in order to explain the principles and the nature of various examples and its practical application to enable one skilled in the art to utilize the present invention in various examples and with various modifications as are suited to the particular use contemplated. The features of the examples described herein may be combined in all possible combinations of methods, apparatus, modules, systems, and computer program products.

What is claimed is:

1. A method, comprising:
receiving a change request input from a user to change one or more parameters of a product in a product visualization, the product to be fabricated;
mapping the change request input to at least one design feature of the product;
determining at least one available option based on the at least one design feature and capabilities of at least one manufacturer; and
presenting a modified product visualization to the user based on at least one determined available option.

2. The method of claim 1, wherein the change request is received from the user through a user interface.

3. The method of claim 2, wherein the user interface allows selection of the one or more parameters from a range of options.

4. The method of claim 2, wherein the product visualization provides the user with a rendering of the product in three dimensions.

5. The method of claim 1, wherein the product is a printed product and the determining at least one available option includes receiving information regarding material properties and fabrication parameters from one or more print service providers (PSPs).

6. The method of claim 5, wherein the printed product is one of a document, a book, a publication, a photobook, a pamphlet, a brochure or a bound presentation.

7. A system, comprising:
one or more databases including data associated with available capabilities of at least one manufacturer for manufacturability of a product;
a translation module to map between at least one design feature of the product and at least one user design selection; and
a visualization module to present a product visualization, wherein the product visualization includes the at least one user design selection and is based on the available capabilities of the at least one manufacturer for manufacturability of the product, the product to be fabricated.

8. The system of claim 7, further comprising:
a translation module to translate selected capabilities of the available capabilities to product visualization by the visualization module.

9. The system of claim 7, wherein the available capabilities are associated with component material properties and fabrication parameters for the product.

10. The system of claim 9, wherein the one or more databases receive information regarding material properties and fabrication parameters from one or more print service providers (PSPs).

11. The system of claim 7, further comprising:
a user interface to allow a user to provide input to the visualization module, the input being associated with a change request associated with the product.

12. The system of claim 11, wherein the visualization module presents a modified product visualization to the user based on the change request and the available capabilities.

13. The system of claim 7, wherein the visualization module provides a rendering of the product in three dimensions.

14. The system of claim 5, wherein the printed product is one of a document, a book, a publication, a photobook, a pamphlet, a brochure or a bound presentation.

15. An apparatus comprising:
at least one processor; and
at least one memory including computer program code, the at least one memory and the computer program code configured to, with the at least one processor, cause the apparatus to perform at least the following:
receiving a change request input from a user to change one or more parameters of a product in a product visualization, the product to be fabricated;
mapping the change request input to at least one design feature of the product;
determining at least one available option based on the at least one design feature and capabilities of at least one manufacturer; and
presenting a modified product visualization to the user based on at least one determined available option.

16. The apparatus of claim 15, wherein the change request is received from the user through a user interface.

17. The apparatus of claim 16, wherein the user interface allows selection of the one or more parameters from a range of options.

18. The apparatus of claim 16, wherein the product visualization provides the user with a rendering of the product in three dimensions.

19. The apparatus of claim 15, wherein the product is a printed product and the determining at least one available option includes receiving information regarding material properties and fabrication parameters from one or more print service providers (PSPs).

20. The apparatus of claim 19, wherein the printed product is one of a document, a book, a publication, a photobook, a pamphlet, a brochure or a bound presentation.

\* \* \* \* \*